Dec. 8, 1959      H. L. STILES      2,916,599

GLASS ELECTRIC PERCOLATOR

Filed Aug. 28, 1957

*INVENTOR.*
HARRY L. STILES

BY

ATTORNEYS

United States Patent Office 2,916,599
Patented Dec. 8, 1959

2,916,599

GLASS ELECTRIC PERCOLATOR

Harry L. Stiles, Cedar Grove, N.J., assignor to The Silex Company, Philadelphia, Pa., a corporation of Connecticut Application August 28, 1957, Serial No. 680,713

2 Claims. (Cl. 219—44)

My invention relates to a coffee percolator and more particularly relates to a glass electric percolator.

In the brewing of coffee in metallic vessels, it has been found that a certain degree of rancidity of the brewed coffee results from contact with metal surfaces wherein the boiling coffee develops a somewhat metallic taste. While glass drip-type coffee brewers have been utilized in the past, the requirements of the drip-type coffee brewer necessitates the use of specially ground coffee grains and boiling water to extract the full coffee essence and body. Furthermore, in the vacuum-type, drip coffee brewer it is required that a large volume of the coffee be boiled in order that the vacuum be created and proper extraction obtained. Moreover, both the drip and vacuum type coffee makers require extensive time for the necessary large volume of water to reach the boiling point. It is to be further noted that while it has been desirable to manufacture a glass electric percolator, heretofore, major difficulties have been experienced in fabricating a glass to metal seal where the glass pot would adjoin the electric heat pump.

It, therefore, is an object of my invention to provide an electric percolator wherein the coffee pot is made of glass and a minimum of metallic components, in which the brewing coffee comes directly into contact, are utilized.

Another object of my invention is to provide a glass electric percolator wherein a positive seal may be maintained between the glass pot and the electrical heating coils at the bottom thereof.

Another object of my invention is to provide a glass electric percolator wherein the percolating effect is obtained rapidly without boiling the entire volume of water.

Another object of my invention is to provide a glass electric percolator wherein small slugs of boiling water are perked through the coffee grounds rapidly to yield full extraction of the coffee essence without rancid taste.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing, in which.

Figure 1:
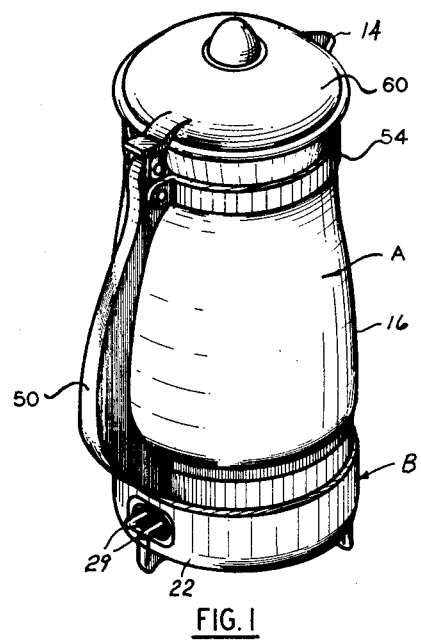
Fig. 1 is a front perspective view of a glass electric percolator embodying my invention.
Figure 2:
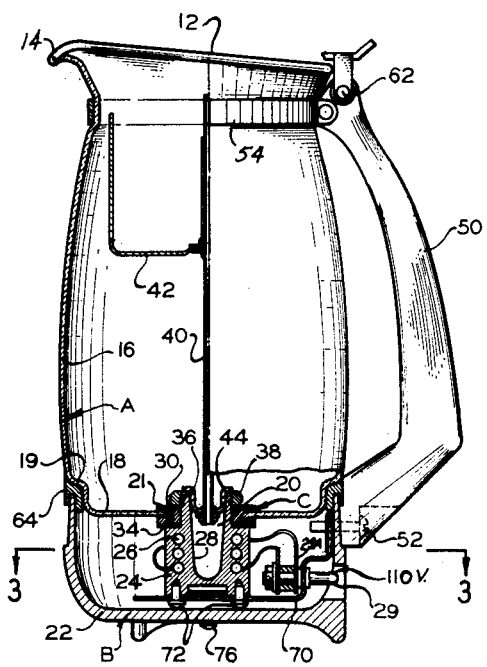
Fig. 2 is a side elevational view thereof and partly in section.
Figure 3:
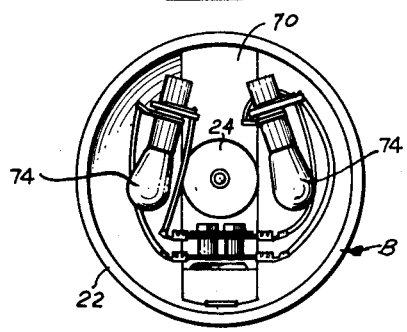
Fig. 3 is a sectional view taken along lines 3—3 of Fig. 2.
Figure 4:
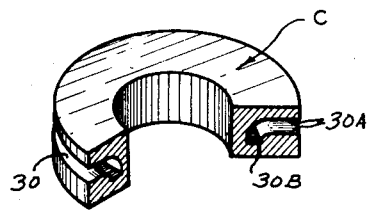
Fig. 4 is a perspective view and partly in section of a gasket for providing a seal between the glass percolator and the electrical coils.
Figure 5:
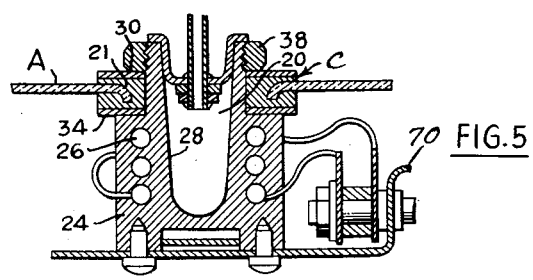
Fig. 5 is an enlarged view of the electrical heating element as connected to the bottom of the glass percolator.

Referring now in greater detail to the drawing in which similar reference characters refer to similar parts, I show a glass electric percolator comprising a glass pot, generally designated as A, an electrical heating unit secured to the bottom thereof, generally designated as B, and a seal generally designated as C.

The coffee pot A is fabricated of Pyrex glass having a generally flask-like configuration with a wide upper mouth portion 12 and a pouring spout 14. A tapered cylindrical wall 16 extends downwardly from the mouth portion 12 and is closed by a bottom 18. Adjacent the lower portion of the wall 16 is a peripheral indented portion 19 which is adapted to rest upon a complementary peripheral flange on the heating element B. A central bore 20 extends through the bottom 18 and peripheral uncinated skirt 21 downwardly projects below the bottom about the bore 20. The nethers of the skirt 21 are spaced from the bottom and are formed by cutting away the tube neck formed during the blowing of the pot.

The heating unit B comprises a metal shell 22 within which is mounted a heat pump 24 having a plurality of electrical coils 26 embedded therein. The center portion of the heat pump 24 has a small arcuate bowl 28 U-shaped in cross section formed therein and communicating with the interior of the glass pot A through the bore 20. Suitable contacts 29 for plugging into a conventional 110 volt supply extend through the shell 22, the interior of the contacts having terminals 29A to which the electrical coils 26 are suitably connected.

The seal C comprises an annular rubber ring having a peripheral slot 30 molded therein. The slot 30 has spaced side walls 30A adapted to abut about the bottom 18 and an interior uncinated portion 30B complementary with the skirt 21. The upper portion of the heat pump 24 has a shoulder 34 upon which the seal C rests. A threaded portion 36 extends upwardly from the shoulder and a nut 38 tightens the seal C upon the shoulder and convergently presses the inner wall of the annular seal C against the threads 36. A percolating tube 40 having a foraminous coffee ground container 42 secured at its upper portion thereof is detachably mounted within the bowl 28 by resting peripheral flanges 44 mounted at the lower portion thereof upon the lips of the threaded portion 36.

A handle 50 is secured to the metal shell 22 by a screw 52, the upper portion of the handle having a peripheral flange ring 54 embracing the walls 16 immediately below the mouth of the glass pot A. A hinged lid 60 is pivotally secured to the upper portion of the handle 50 by a rivet 62. The lid 60 is of glass and mounts within the mouth 12 of the pot to provide an obstruction surface for the percolating coffee. A suitable rubber grommet 64 is spaced between the peripheral indentation 19 and the peripheral edge of the metal shell 22 whereby the metal shell may be in resilient abutment with the glass pot A.

The heat pump 24 is mounted upon a bracket pan 70 by machine screws 72 and the contacts 29 are likewise secured upon the pan 70 in order to provide a unitary interior construction for the heating unit B. A pair of lamps 74 are supported upon the upper portion of the pan 70 and are electrically connected across the contacts 29 whereby light is directed into the glass pot to produce an attractive cascading amber glow as coffee is being brewed. The bracket pan 70 is secured within the interior of the metal shell 22 by machine screws 76.

As is apparent from the foregoing description, a minimum of metallic components are utilized to enable the coffee brew to be secure from metallic rancidity. Since the heat pump 24 has a small bowl 28, heating of the coils 26 will cause some slugs of water to percolate rapidly up through the tube 40 and to fall upon grounds within the container 42. The slugs of water are at the boiling point although the remainder of the volume of the water within the pot A may be at room temperature. Continual dropping of the hot slugs through the coffee grounds will fall through the container 42 and heat the remainder of the volume of the water contained within the pot. The uncinated construction of the seal C enables a rigid securing of the glass pot to the metallic heating element without leakage of the water within the pot into the heating element. The configuration of the uncinated slot in combination with the complementary lips adjacent the bore permits the internal edges of the seal to fit securely about the threaded portion 36 and the lower portion of the seal tautly against the shoulder 34.

Although my invention has been described in considerable detail, such description is intended as being illustrative rather than limiting, since the invention may be variously embodied, and the scope of the invention is to be determined as claimed.

I claim as my invention:

1. In an electric percolator, a glass pot having a tapered wall peripherally extending upwardly from a bottom, a peripheral uncinated skirt integrally formed and downwardly projecting from said bottom about a central bore therein, an annular rubber seal having a peripheral uncinated slot therein in complementary engagement with opposed faces of said uncinated skirt, and an electric heat pump having an arcuate bowl communicating with the interior of said pot, a peripheral shoulder on said heat pump in abutting engagement with the bottom of said annular seal, a threaded portion extending upwardly from said shoulder through the center of said annular seal into said pot, a nut secured upon said threaded portion whereby said seal will be compressed upon said shoulder about said uncinated skirt and the inner wall of said annular seal will be convergently pressed against said threaded portion, said heat pump being secured within a metal shell, the edges of said shell having a slotted gasket secured thereon, said gasket being in abutting engagement with a peripheral indentation at the exterior of said glass pot intermediate the bottom and tapered wall thereof, and a plurality of lamps mounted within said shell below said glass pot to provide an amber cascading glow to coffee being brewed therein.

2. The invention of claim 1 wherein the electrical heating unit is supported on a bracket pan which carries the electrical contacts for the electrical heating unit, a handle attached to said glass pot, and means for connecting said bracket pan to said handle.

References Cited in the file of this patent

UNITED STATES PATENTS

| | | |
|---|---|---|
| 1,582,165 | Cantor | Apr. 27, 1926 |
| 1,708,663 | Cross | Apr. 9, 1929 |
| 1,998,732 | Olds | Apr. 23, 1935 |
| 2,046,710 | Umstott | July 7, 1936 |
| 2,166,728 | Page | July 18, 1939 |
| 2,216,738 | Felix | Oct. 8, 1940 |
| 2,801,326 | Sullivan | July 30, 1957 |

FOREIGN PATENTS

| | | |
|---|---|---|
| 719,962 | Great Britain | Dec. 8, 1954 |